United States Patent
Kim

(10) Patent No.: US 10,838,535 B2
(45) Date of Patent: Nov. 17, 2020

(54) DISPLAY APPARATUS AND METHOD OF SENSING TOUCH IN DISPLAY APPARATUS

(71) Applicant: Samsung Display Co., Ltd., Yongin-si (KR)

(72) Inventor: Seon-Ki Kim, Uiwang-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 15/137,469

(22) Filed: Apr. 25, 2016

(65) Prior Publication Data
US 2017/0160868 A1    Jun. 8, 2017

(30) Foreign Application Priority Data
Dec. 3, 2015  (KR) .......................... 10-2015-0171160

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
CPC ... G06F 3/043–047; G06F 2203/04108–04113
See application file for complete search history.

(56) References Cited

U.S. PATENT DOCUMENTS

| | | | |
|---|---|---|---|
| 2002/0059074 A1* | 5/2002 | Bhadkamkar | G11B 27/10 704/500 |
| 2008/0198153 A1* | 8/2008 | Yu | G09G 5/006 345/214 |
| 2012/0229419 A1* | 9/2012 | Schwartz | G06F 3/0418 345/174 |
| 2013/0050144 A1* | 2/2013 | Reynolds | G06F 3/044 345/174 |
| 2013/0050151 A1* | 2/2013 | Tu | G06F 3/0416 345/178 |
| 2014/0240259 A1 | 8/2014 | Park et al. | |
| 2016/0370915 A1* | 12/2016 | Agarwal | G06F 3/0416 |
| 2017/0108970 A1* | 4/2017 | Kim | G06F 3/0412 |

* cited by examiner

*Primary Examiner* — William Boddie
*Assistant Examiner* — Jeffrey Parker
(74) *Attorney, Agent, or Firm* — H.C. Park & Associates, PLC

(57) ABSTRACT

A method of sensing a touch in a display apparatus includes: determining a display frame rate of an input image applied to the display apparatus; determining a number of touch driving blocks according to the display frame rate; and sensing a touch based on driving one touch driving block of the determined touch driving blocks at each display frame.

15 Claims, 11 Drawing Sheets

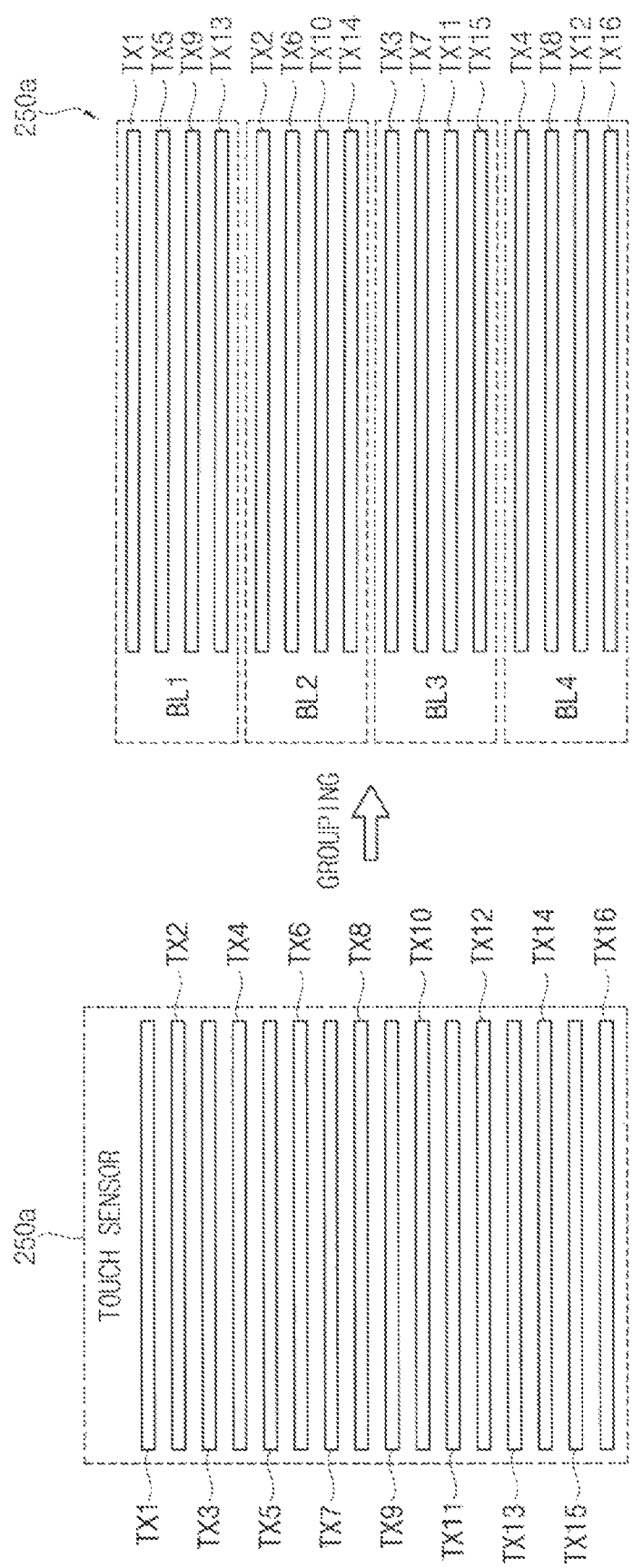

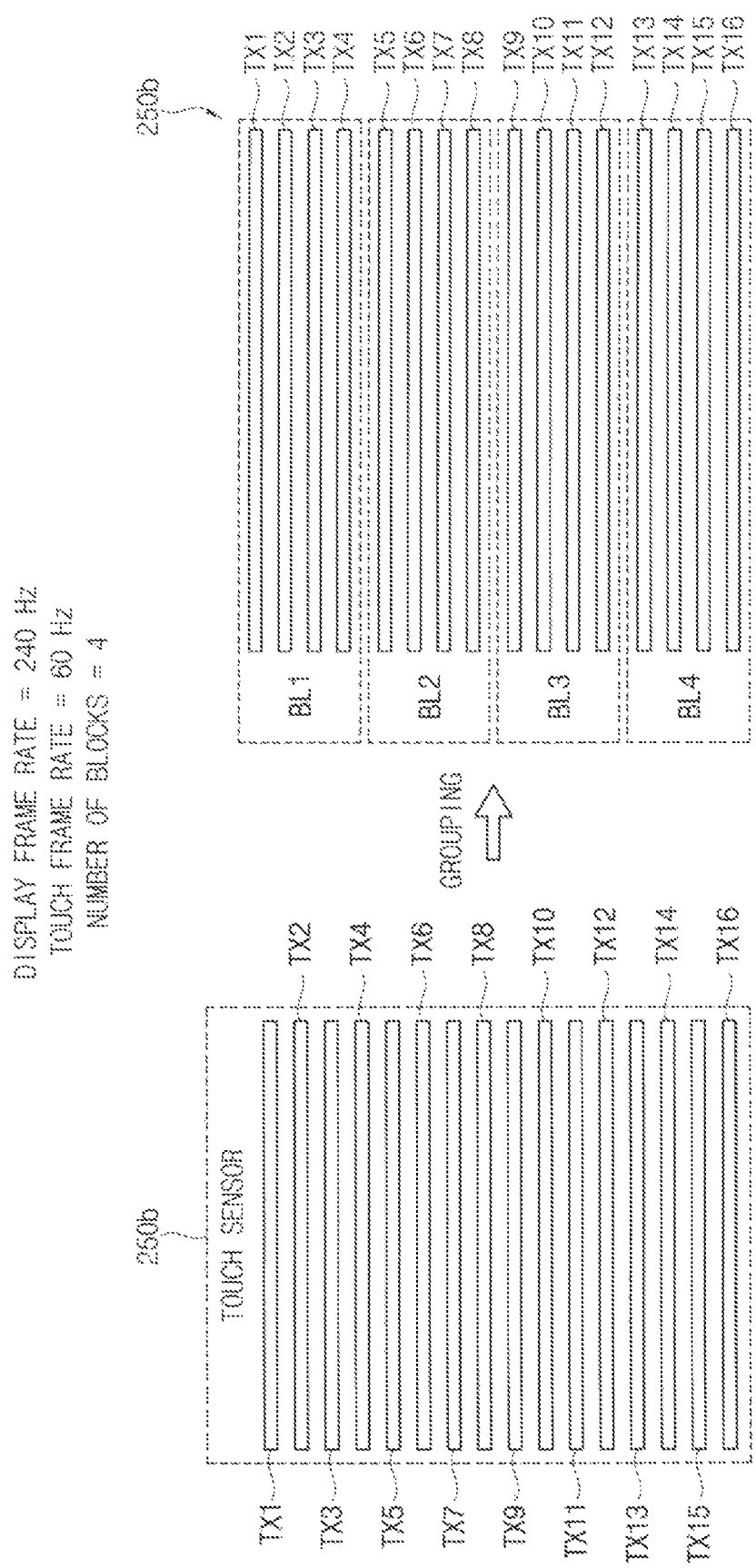

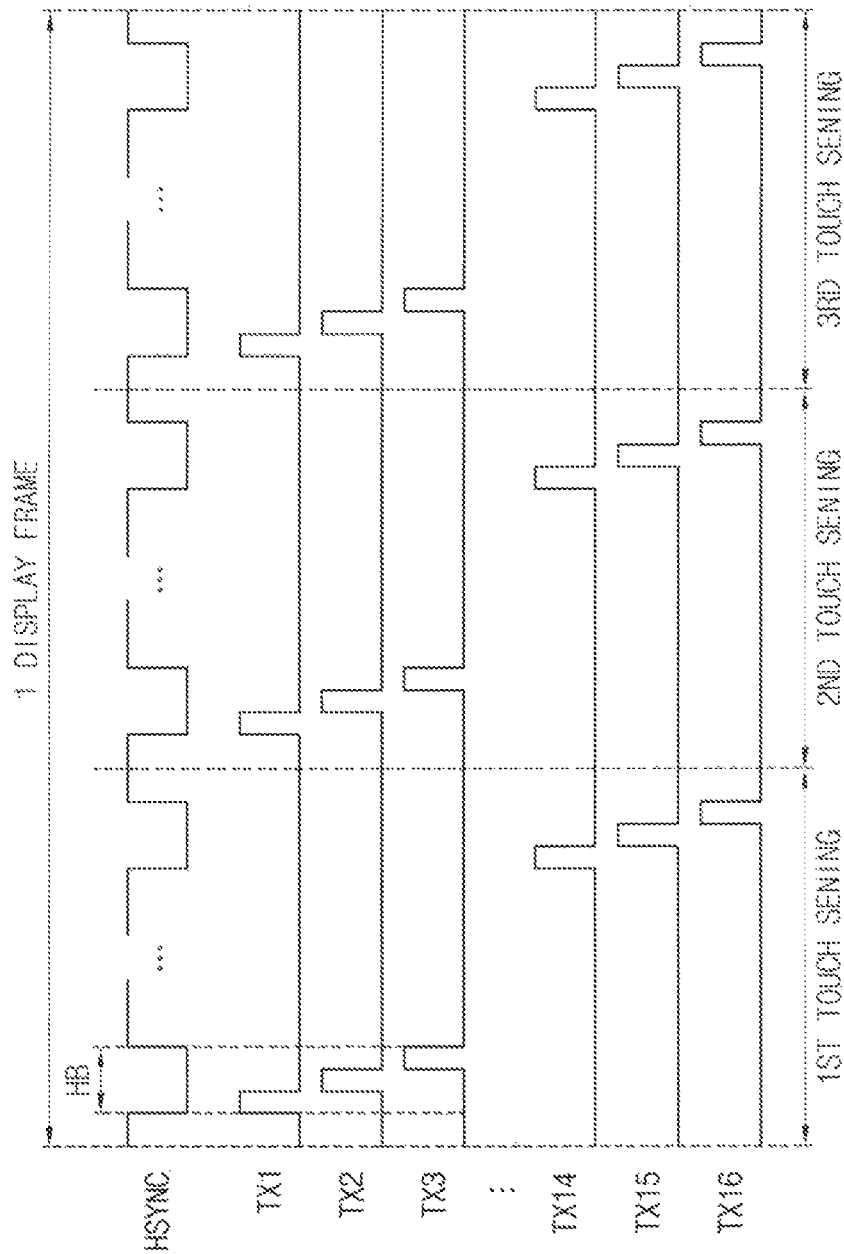

DISPLAY APPARATUS AND METHOD OF SENSING TOUCH IN DISPLAY APPARATUS

CROSS-REFERENCE TO RELATED APPLICATION

This application claims priority from and the benefit of Korean Patent Application No. 10-2015-0171160, filed on Dec. 3, 2015, which is hereby incorporated by reference for all purposes as if fully set forth herein.

BACKGROUND

Field

One or more exemplary embodiments relate to a display apparatus and a method of sensing a touch in a display apparatus.

Discussion of the Background

A touch sensor may be utilized as an input device configured to recognize a position of a touch (or hovering interaction) when an appendage (e.g., finger, hand, etc.) of a person or an object is in contact with (or hovering closely over) the touch sensor. The touch sensor may be mounted on a surface of a display panel, such as an organic light emitting diode (OLED) display panel, a liquid crystal display (LCD) panel, etc., or may be built in the display panel. The touch sensor may be classified into a capacitive touch sensor, a resistive touch sensor, an electromagnetic touch sensor, an infrared touch sensor, a surface acoustic wave (SAW) touch sensor, a near filed imaging (NFI) touch sensor, etc.

A display device may be driven using a technique that changes a display frame rate of an input image of a display device to reduce power consumption of the display device and an electronic device including the display device. It is noted, however, that a conventional display device performs a touch sensing operation with a touch frame rate substantially the same as the display frame rate of the input image. A charging time for charging a driving line of a touch sensor may become insufficient as the display frame rate increases. Further, as the display frame rate decreases, a speed of the touch sensing operation decreases, and, as such, the touch sensing operation may be inaccurately performed.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a display apparatus configured to operate a touch sensing function more accurately and efficiently even when a display frame rate of an input image is changed.

Exemplary embodiments provide a method of sensing a touch in a display apparatus.

Additional aspects will be set forth in the detailed description which follows, and, in part, will be apparent from the disclosure, or may be learned by practice of the inventive concept.

According to one or more exemplary embodiments, a method of sensing a touch in a display apparatus includes: determining a display frame rate of an input image applied to the display apparatus; determining a number of touch driving blocks according to the display frame rate; and sensing a touch based on driving one touch driving block of the determined touch driving blocks at each display frame.

According to one or more exemplary embodiments, a display apparatus includes a display panel configured to display an image, a touch sensor disposed on the display panel, and a touch controller. The touch sensor includes driving lines and sensing lines. The touch controller is configured to: determine a display frame rate of an input image applied to the display apparatus, determine a number of touch driving blocks according to the display frame rate, group the driving lines into the determined number of the touch driving blocks, and drive one touch driving block of the determined touch driving blocks at each display frame to sense a touch.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 5A is a conceptual diagram of a process to group driving lines into touch driving blocks, according to one or more exemplary embodiments.

FIG. 5B is a conceptual diagram of a process to group driving lines into touch driving blocks, according to one or more exemplary embodiments.

FIG. 8 is a timing diagram of an operation of a touch sensor with driving lines grouped into one touch driving block at a relatively low display frame rate, according to one or more exemplary embodiments.

DETAILED DESCRIPTION OF THE ILLUSTRATED EMBODIMENTS

Figure 1:
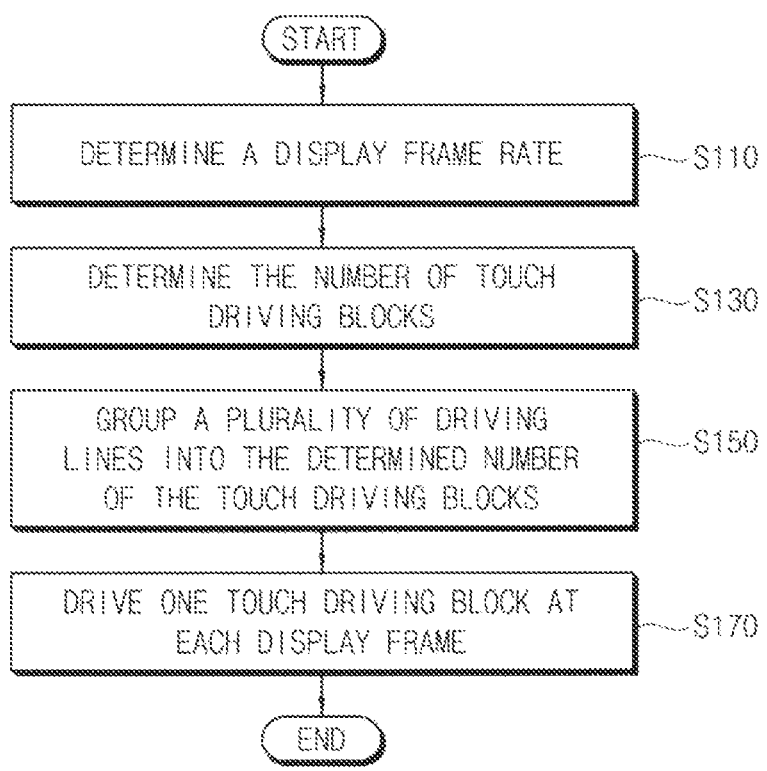
FIG. 1 is a flowchart of a process to sense a touch in a display apparatus, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a flowchart of a process to sense a touch in a display apparatus, according to one or more exemplary embodiments.

Referring to FIG. 1, in a method of sensing a touch in a display apparatus including a display panel that displays an image and a touch sensor that includes a plurality of driving lines and a plurality of sensing lines, the display apparatus determines a display frame rate of an input image applied to the display apparatus (S110). To reduce power consumption of the display apparatus and power consumption of an electronic device including the display apparatus, a technique to dynamically change the display frame rate of the input image of the display apparatus, such as a panel self refresh (PSR) technique, a FreeSync technique, a media buffer optimization (MBO) technique, a dynamic refresh rates technique, etc., may be utilized. The method of sensing the touch in the display apparatus, according to one or more exemplary embodiments, may include determining the display frame rate of the input image in the display apparatus to which the technique that dynamically changes the display frame rate is applied. The display apparatus may receive a display frame rate signal indicating the display frame rate from an external host (e.g., an application processor (AP) or a graphics processing unit (GPU)) that controls the display apparatus, and may determine the display frame rate of the input image based on the display frame rate signal. The display apparatus may receive a vertical synchronization signal from the external host that controls the display apparatus, and may determine the display frame rate of the input image based on the vertical synchronization signal.

The display apparatus determines the number of touch driving blocks according to the display frame rate (S130). The number of the touch driving blocks may be determined in proportional to the display frame rate. For example, the number of the touch driving blocks may increase as the display frame rate increases and may decrease as the display frame rate decreases. According to one or more exemplary embodiments, the number of the touch driving blocks may be determined by dividing the display frame rate by a touch frame rate of the touch sensor and by rounding up the display frame rate divided by the touch frame rate. The touch frame rate of the touch sensor may be determined according to a size and a configuration of the touch sensor. The touch frame rate may be the maximum frame rate among frame rates at which the plurality of driving lines in the touch sensor is sufficiently charged to a target charge level. For example, when the display frame rate is about 240 Hz and the touch frame rate is about 60 Hz, the display apparatus may determine the number of the touch driving blocks as four.

The display apparatus groups the plurality of driving lines into the determined number of the touch driving blocks (S150). According to one or more exemplary embodiments, a first driving line and a second driving line, which is adjacent to the first driving line, of the plurality of driving lines may be grouped into different touch driving blocks. For example, the first driving line may belong to a first touch driving block, and the second driving line may belong to a second touch driving block. According to one or more exemplary embodiments, a first driving line and a second driving line, which is adjacent to the first driving line, of the plurality of driving lines may be grouped into the same touch driving block. For example, the plurality of driving lines may be divided into the determined number of parts, and the divided parts may be respectively designated to the determined touch driving blocks.

To sense a touch, the display apparatus drives one touch driving block of the determined touch driving blocks at each display frame (S170). The touch driving blocks may be sequentially driven at respective display frames. For example, all driving lines may be driven once through the number of display frames which is the same as the determined number of the touch driving blocks. According to one or more exemplary embodiments, the plurality of driving lines may be driven during horizontal blank periods of the display panel, and the number of the horizontal blank periods during which each of the plurality of driving lines is driven increases as the number of the touch driving blocks increases. For example, when a display frame rate is doubled with respect to a display frame rate at which one driving line is driven during one horizontal blank period, each driving line may be driven during two horizontal blank periods. Accordingly, even if each horizontal blank period is decreased as the display frame rate increases, the number of horizontal blank periods during which each driving line is driven may increase, and, as such, each driving line may be sufficiently charged to a target charge level. Further, when the display frame rate is reduced to a relatively low display frame rate, two or more driving lines may be sequentially driven during one horizontal blank period. In this manner, even if the display frame rate is lowered, a speed of a touch sensing operation of the touch sensor may not be reduced.

In a conventional display device, a touch sensing operation is performed with a touch frame rate substantially the same as a display frame rate of an input image. In this manner, if the display frame rate is changed to a relatively high display frame rate, a time period during which each driving line is driven or a time period during which each driving line is charged may be reduced, and, as such, the touch sensing operation may not be accurately performed. Further, if the display frame rate is changed to a relatively low display frame rate, a speed of a touch sensing operation of a touch sensor may be reduced. According to one or more exemplary embodiments, the number of the touch driving blocks may be determined according to the display frame rate of the input image, the plurality of driving lines of the touch sensor may be grouped into the determined number of the touch driving blocks, and one touch driving block may be driven at each display frame rate. In this manner, even if the display frame rate of the input image is changed to a relatively high display frame rate or to a relatively low display frame rate, the touch sensing operation of the touch sensor may be accurately and efficiently performed.

Figure 2:
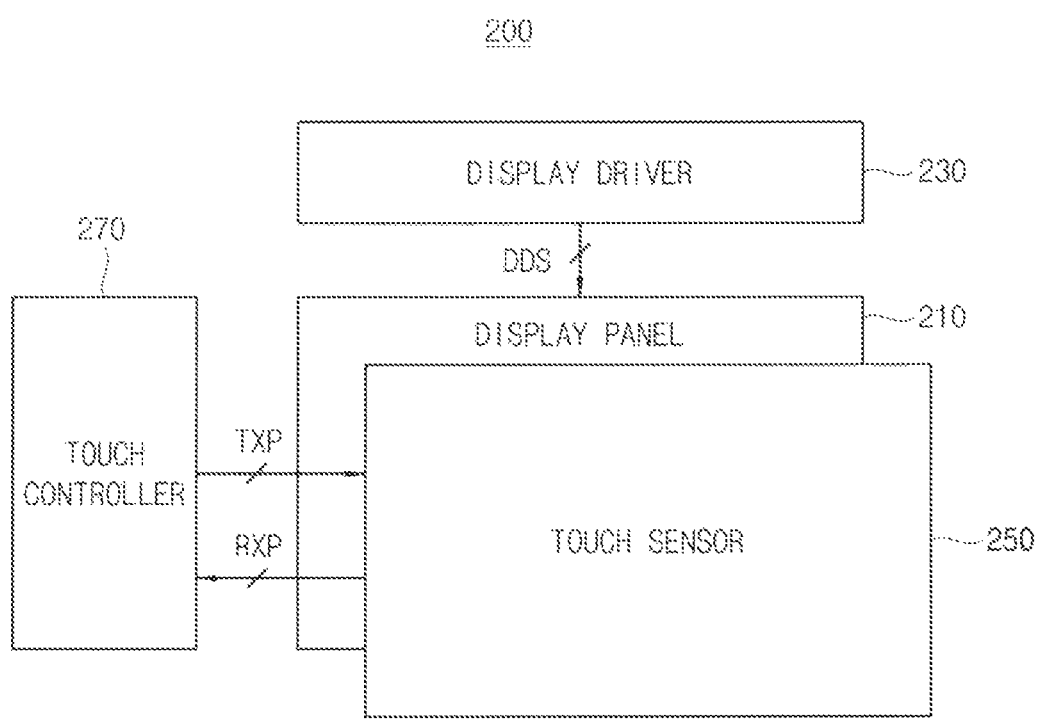
FIG. 2 is a conceptual block diagram of a display apparatus, according to one or more exemplary embodiments.
Figure 3:
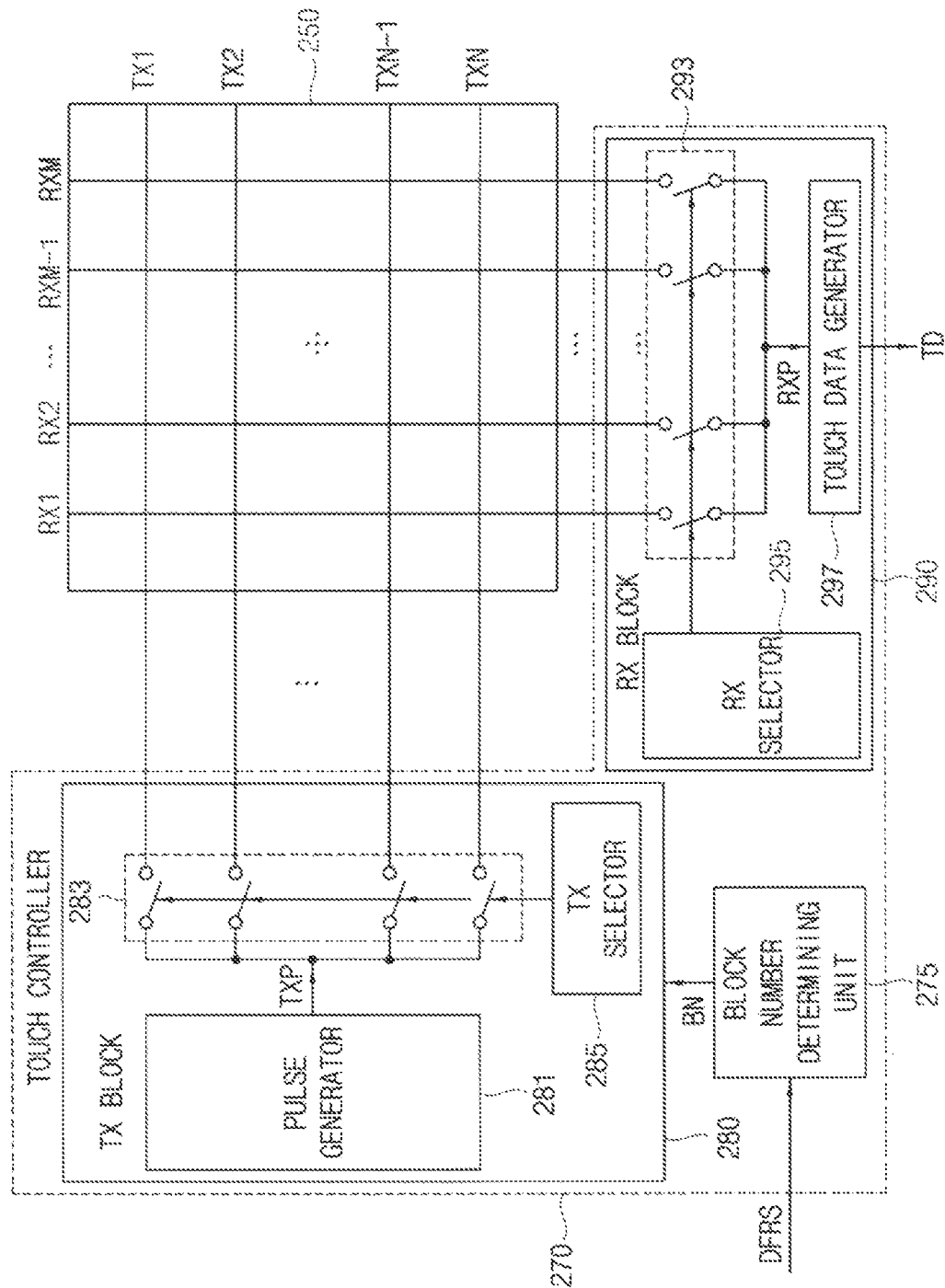
FIG. 3 is a conceptual block diagram of a touch sensor and a touch controller of FIG. 2, according to one or more exemplary embodiments.

FIG. 2 is a conceptual block diagram of a display apparatus, according to one or more exemplary embodiments, and FIG. 3 is a conceptual block diagram of a touch sensor and a touch controller of FIG. 2, according to one or more exemplary embodiments.

Referring to FIGS. 2 and 3, a display apparatus 200 may include a display panel 210, a display driver 230, a touch sensor 250, and a touch controller 270. According to one or more exemplary embodiments, the touch controller 270 may include a block number determining unit (or block number determiner) 275, a transmitting block (or transmitter) 280, and a receiving block (or receiver) 290.

The display panel 210 may display an image. For example, the display panel 210 may be one of various display panels, such as a liquid crystal display (LCD) panel, an organic light emitting diode (OLED) display panel, a light emitting diode (LED) display panel, a field emission display (FED) panel, a plasma display panel (PDP), etc.

The display driver 230 may drive the display panel 210. The display driver 230 may apply a display data signal DDS to the display panel 210, and the display panel 210 may display an image based on the display data signal DDS. For example, the display driver 230 may include a scan driver that selects each row of pixels in the display panel 210, a source driver that applies the display data signal DDS to the selected row of pixels, and a timing controller that controls the scan driver and the source driver.

The touch sensor 250 may include a plurality of driving lines TX1, TX2, . . . , TXN−1, and TXN ("N" being a natural number greater than zero) extending in a first direction, and a plurality of sensing lines RX1, RX2, . . . , RXM−1, and RXM ("M" being a natural real number greater than zero) extending in a second direction, which may be perpendicular (or substantially perpendicular) to the first direction. According to one or more exemplary embodiments, the touch sensor 250 may be a capacitive touch sensor, a resistive touch sensor, an electromagnetic touch sensor, an infrared touch sensor, a surface acoustic wave (SAW) touch sensor, a near filed imaging (NFI) touch sensor, or the like. Further, according to one or more exemplary embodiments, the touch sensor 250 may be an add-on type touch sensor that is attached to the display panel 210, an embedded type touch sensor that is formed in the display panel 210, or the like. For example, the touch sensor 250 may be an on-cell type embedded touch sensor where touch sensor cells are formed on pixels of the display panel 210, or an in-cell type embedded touch sensor where the touch sensor cells are formed in the pixels of the display panel 210. Although FIG. 3 illustrates an example of a touch sensor 250 that senses a touch by measuring a mutual capacitance between the plurality of driving lines TX1, TX2, . . . , TXN−1, and TXN and the plurality of sensing lines RX1, RX2, . . . , RXM−1, and RXM, the touch sensor 250 may be a self capacitance type touch sensor that senses a touch by measuring a self capacitance of each touch sensor cell.

The touch controller 270 may drive the touch sensor 250. For example, to drive the touch sensor 250, the touch controller 270 may apply a driving pulse TXP to the plurality of driving lines TX1, TX2, . . . , TXN−1, and TXN of the touch sensor 250, and may receive outputs RXP from the plurality of sensing lines RX1, RX2, . . . , RXM−1, and RXM of the touch sensor 250. The touch controller 270 may determine a display frame rate of an input image provided from an external host (e.g., an application processor (AP) or a graphics processing unit (GPU)) to the display apparatus 200, may determine the number BN of touch driving blocks according to the display frame rate, may group the plurality of driving lines TX1, TX2, TXN−1 and TXN into the determined number BN of the touch driving blocks, and may drive one touch driving block of the determined number BN of the touch driving blocks at each display frame to sense a touch. To perform this operation, the touch controller 270 may include the block number determining unit 275, the transmitting block 280 and the receiving block 290.

The block number determining unit 275 may determine the display frame rate, and may determine the number BN of the touch driving blocks according to the display frame rate. The block number determining unit 275 may receive a display frame rate signal DFRS indicating the display frame rate from the external host (e.g., the AP or the GPU) that controls the display apparatus 200, and may determine the display frame rate of the input image based on the display frame rate signal DFRS. The block number determining unit 275 may receive a vertical synchronization signal from the external host that controls the display apparatus, and may determine the display frame rate of the input image based on the vertical synchronization signal. For example, the block number determining unit 275 may determine the display frame rate based on a time interval between adjacent vertical synchronization signals. Further, the block number determining unit 275 may determine the number BN of the touch driving blocks in proportion to the display frame rate. For instance, the block number determining unit 275 may determine the number BN of the touch driving blocks such that the number BN of the touch driving blocks increases as the display frame rate increases and decreases as the display frame rate decreases.

The transmitting block 280 may apply the driving pulse TXP to the plurality of driving lines TX1, TX2, . . . , TXN−1, and TXN. According to one or more exemplary embodiments, the transmitting block 280 may include a pulse generator 281, a first switching unit 283, and a driving line selector 285. The pulse generator 281 may generate the driving pulse TXP. The first switching unit 283 may be controlled by the driving line selector 285 to connect the pulse generator 281 to a selected one of the plurality of driving lines TX1, TX2, . . . , TXN−1, and TXN. The transmitting block 280 may drive one touch driving block of the determined number BN of the touch driving blocks at each display frame. For example, the transmitting block 280 may receive the determined number BN from the block number determining unit 275, may group the plurality of driving lines TX1, TX2, . . . , TXN−1, and TXN into the determined number BN of the touch driving blocks, and may control the first switching unit 283 such that the driving pulse TXP is applied only to the driving lines in one touch driving block at each display frame.

The receiving block 290 may receive outputs RXP from the plurality of sensing lines RX1, RX2, . . . , RXM−1, and RXM. According to one or more exemplary embodiments, the receiving block 290 may include a second switching unit 293, a sensing line selector 295, and a touch data generator 297. The second switching unit 293 may be controlled by the sensing line selector 295 to connect a selected one of the plurality of sensing lines RX1, RX2, . . . , RXM−1, and RXM to the touch data generator 297. For example, the sensing line selector 295 may control the second switching unit 293 such that the outputs RXP from the plurality of sensing lines RX1, RX2, . . . , RXM−1, and RXM are sequentially applied to the touch data generator 297. The touch data generator 297 may generate touch data TD based on the outputs RXP that are sequentially received through the second switching unit 293 from the plurality of sensing lines RX1, RX2, . . . , RXM−1, and RXM. The touch data generator 297 may provide the touch data TD to the external host (e.g., the AP or the GPU).

Hereinafter, a method of sensing a touch in the display apparatus 200 according to one or more exemplary embodiments will be described with reference to FIGS. 2 through 8.

Figure 4:
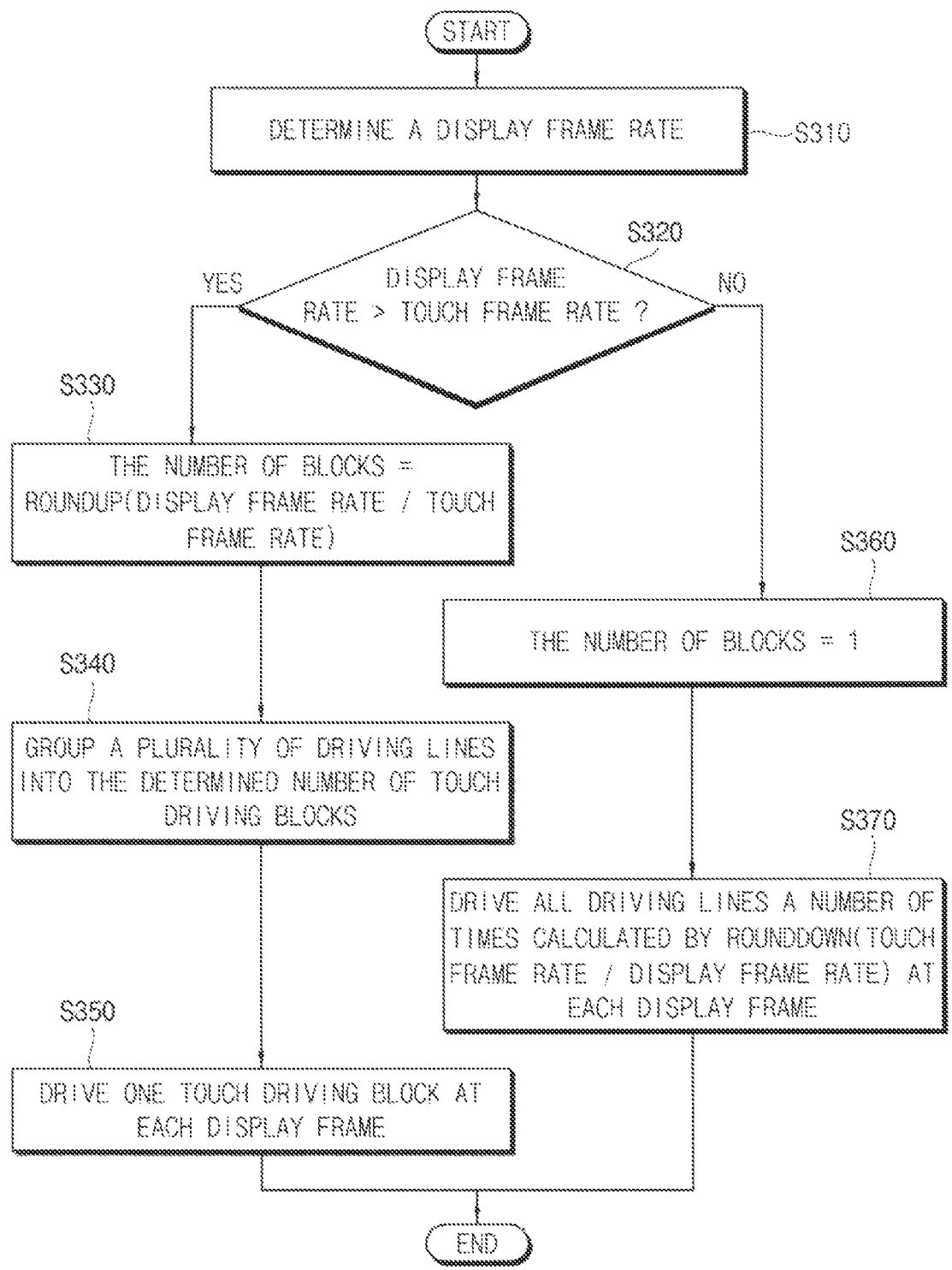
FIG. 4 is a flowchart of a process to sense a touch in a display apparatus, according to one or more exemplary embodiments.
Figure 6:
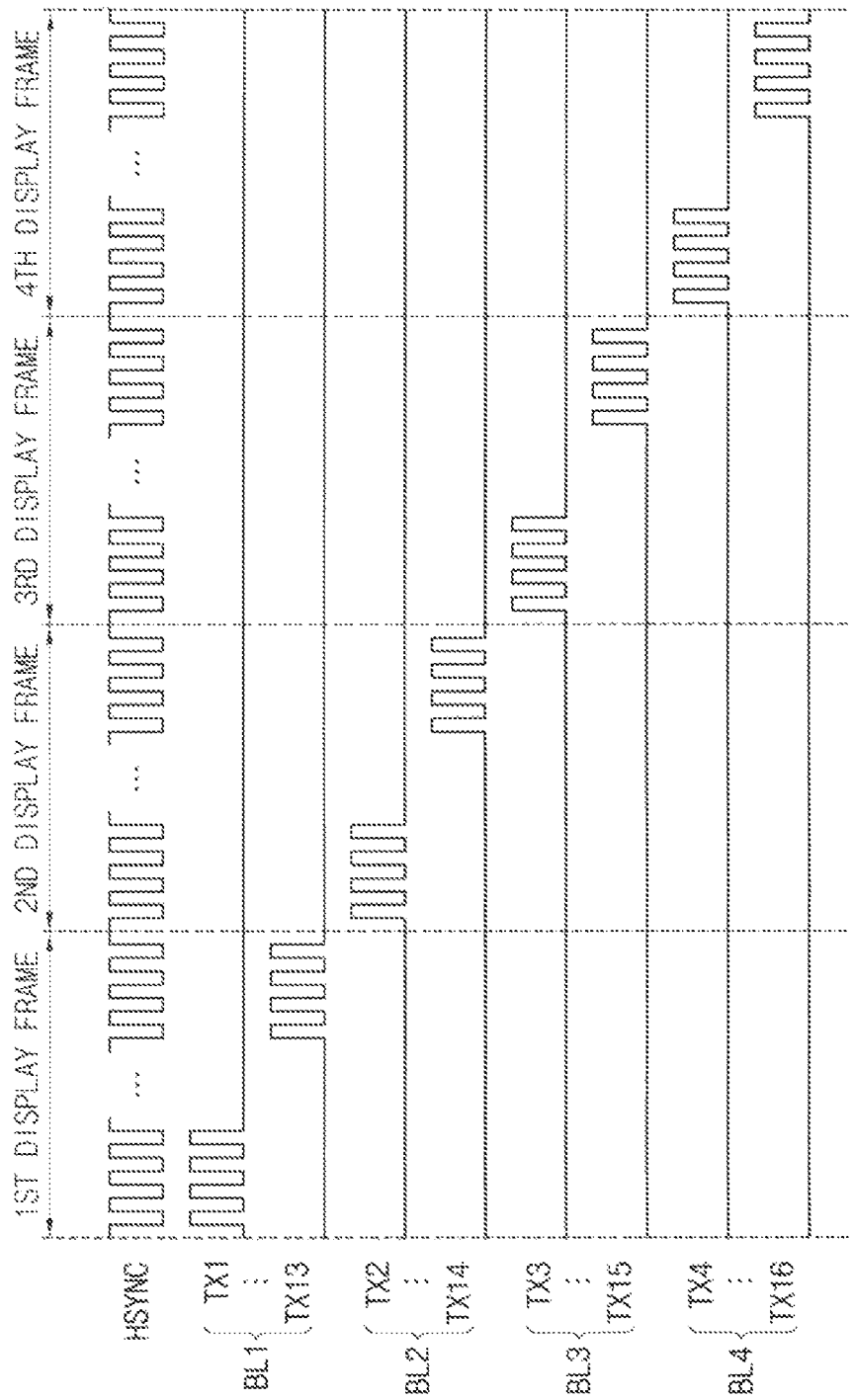
FIG. 6 is a timing diagram of an operation of a touch sensor with driving lines grouped into four touch driving blocks at a relatively high display frame rate, according to one or more exemplary embodiments.
Figure 7A:
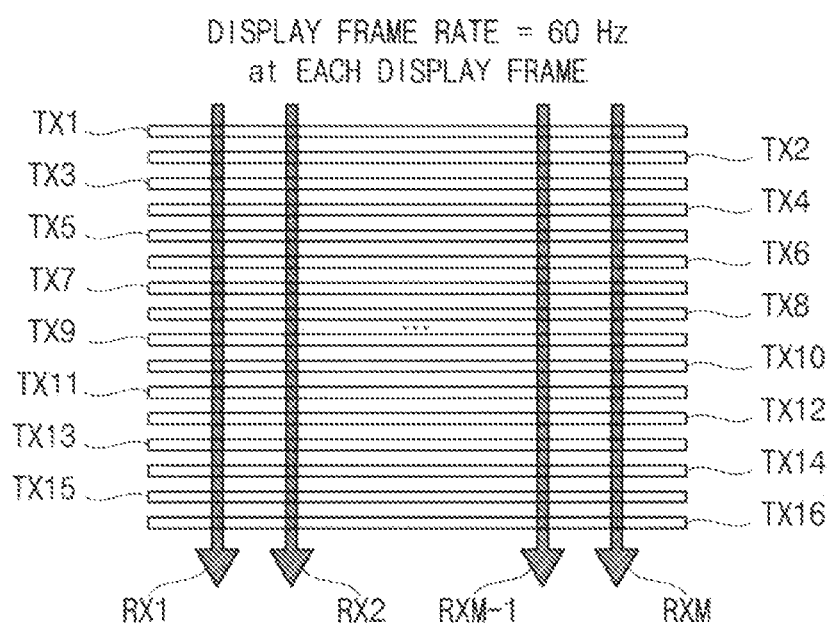
FIG. 7A is a conceptual diagram of a touch sensing operation of a touch sensor at a display frame rate of 60 Hz, according to one or more exemplary embodiments.
Figure 7B:
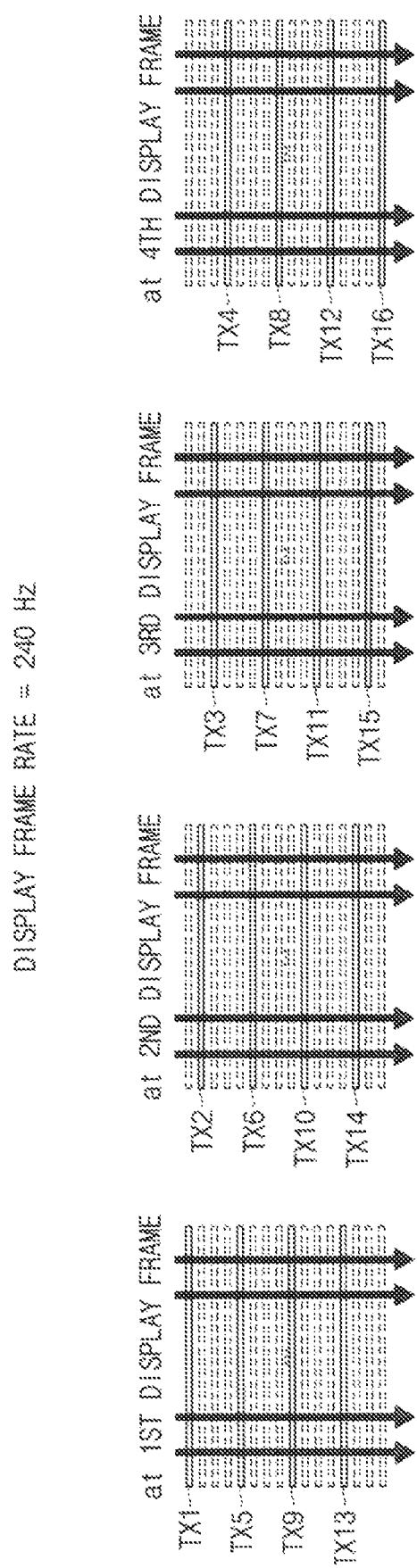
FIG. 7B is a conceptual diagram of a touch sensing operation of a touch sensor at a display frame rate of 240 Hz, according to one or more exemplary embodiments.

FIG. 4 is a flowchart of a process to sense a touch in a display apparatus, FIG. 5A is a conceptual diagram of a process to group driving lines into touch driving blocks, FIG. 5B is a conceptual diagram of a process to group driving lines into touch driving blocks, FIG. 6 is a timing diagram of an operation of a touch sensor with driving lines grouped into four touch driving blocks at a relatively high display frame rate, FIG. 7A is a conceptual diagram of a touch sensing operation of a touch sensor at a display frame rate of 60 Hz, FIG. 7B is a conceptual diagram of a touch sensing operation of a touch sensor at a display frame rate of 240 Hz, and FIG. 8 is a timing diagram of an operation of a touch sensor with driving lines grouped into one touch driving block at a relatively low display frame rate, according to one or more exemplary embodiments.

Referring to FIGS. 2 through 4, the display apparatus 200 may determine a display frame rate of the input image applied to the display apparatus 200 (S310). According to one or more exemplary embodiments, the block number determining unit 275 of the touch controller 270 may receive the display frame rate signal DFRS indicating the display frame rate from the external host (e.g., the AP or the GPU), and may determine the display frame rate of the input image based on the display frame rate signal DFRS. According to one or more exemplary embodiments, the block number determining unit 275 of the touch controller 270 may receive the vertical synchronization signal from the external host, and may determine the display frame rate of the input image based on the vertical synchronization signal.

The display apparatus 200 may determine the number BN of the touch driving blocks according to the determined display frame rate (S320, S330, and S360). According to one or more exemplary embodiments, the block number determining unit 275 of the touch controller 270 may determine the number BN of the touch driving blocks by dividing the display frame rate by the touch frame rate of the touch sensor 250 and rounding up the display frame rate divided by the touch frame rate (S330). When the display frame rate is less than or equal to the touch frame rate (S320: NO), the calculated number BN of the touch driving blocks may be 1 (S360). When the display frame rate is greater than the touch frame rate (S320: YES), the determined number BN of the touch driving blocks may be two or more (S330).

When the display frame rate is greater than the touch frame rate (S320: YES), the calculated number BN may be determined to be two or more (S330), and the transmitting block 280 of the touch controller 270 may group the plurality of driving lines TX1, TX2, . . . , TXN−1, and TXN into the determined number BN of the touch driving blocks (S340). According to one or more exemplary embodiments, the transmitting block 280 may group the plurality of driving lines TX1, TX2, . . . , TXN−1, and TXN such that adjacent driving lines of the plurality of driving lines TX1, TX2, . . . , TXN−1, and TXN belong to different touch driving blocks, respectively. For example, as illustrated in FIG. 5A, when the display frame rate is about 240 Hz and the touch frame rate is about 60 Hz, the block number determining unit 275 may determine the number BN of the touch driving blocks as four, and the transmitting block 280 may group the plurality of driving lines TX1, TX2, TX3, and TX4 of the touch sensor 250a into four touch driving blocks BL1, BL2, BL3, and BL4. Further, the transmitting block 280 may sequentially assign the plurality of driving lines TX1 through TX16 of the touch sensor 250a to the respective touch driving blocks BL1, BL2, BL3, and BL4 such that one driving line (e.g., TX1) is designated to one touch driving block (e.g., BL1) and the next driving line (e.g., TX2) is designated to the next touch driving block (e.g., BL2). For example, the transmitting block 280 may group first, fifth, ninth, and thirteenth driving lines TX1, TX5, TX9, and TX13 into a first touch driving block BL1, may group second, sixth, tenth, and fourteenth driving lines TX2, TX6, TX10, and TX14 into a second touch driving block BL2, may group third, seventh, eleventh, and fifteenth driving lines TX3, TX7, TX11, and TX15 into a third touch driving block BL3, and may group fourth, eighth, twelfth, and sixteenth driving lines TX4, TX8, TX12, and TX16 into a fourth touch driving block BL4.

The transmitting block 280 may group the plurality of driving lines TX1, TX2, ..., TXN−1, and TXN such that adjacent driving lines of the plurality of driving lines TX1, TX2, ..., TXN−1, and TXN belong to the same touch driving block. For example, as illustrated in FIG. 5B, the transmitting block 280 may group first, second, third, and fourth driving lines TX1, TX2, TX3, and TX4 of the touch sensor 250b into a first touch driving block BL1, may group fifth, sixth, seventh, and eighth driving lines TX5, TX6, TX7, and TX8 into a second touch driving block BL2, may group ninth, tenth, eleventh, and twelfth driving lines TX9, TX10, TX11, and TX12 into a third touch driving block BL3, and may group thirteenth, fourteenth, fifteenth, and sixteenth driving lines TX13, TX14, TX15, and TX16 into a fourth touch driving block BL4. Although FIGS. 5A and 5B illustrate examples with sixteen driving lines TX1 through TX16 of the touch sensor 250a and 250b being grouped, the method of sensing a touch is not limited thereto. In this manner, any suitable number of driving lines may be utilized in association with exemplary embodiments described herein.

The display apparatus 200 may sense the touch by driving one touch driving block among the determined number BN of the touch driving blocks at each display frame (S350). For example, as illustrated in FIG. 6, the transmitting block 280 may drive the driving lines in the first touch driving block BL1 (e.g., driving lines TX1 and TX13) at a first display frame, may drive the driving lines in the second touch driving block BL2 (e.g., driving lines TX2 and TX14) at a second display frame, may drive the driving lines in the third touch driving block BL3 (e.g., driving lines TX3 and TX15) at a third display frame, and may drive the driving lines in the fourth touch driving block BL4 (e.g., driving lines TX4 and TX16) at a fourth display frame. Accordingly, when the display frame rate is greater than the touch frame rate, all driving lines TX1, TX2, ..., TXN−1, and TXN of the touch sensor 250 may be driven once during the number of display frames which is the same as the number BN of the touch driving blocks. For example, with respect to a display apparatus where the touch sensor 250 performs a touch sensing operation once per display frame at a display frame rate of about 60 Hz as illustrated in FIG. 7A, if the display frame rate is increased to about 240 Hz, the plurality of driving lines TX1, TX2, ..., TXN−1, and TXN may be grouped into four touch driving blocks, and the touch sensor 250 may perform the touch sensing operation once through four display frames as illustrated in FIG. 7B. Although FIG. 7B illustrates an example with the driving lines being grouped such that adjacent driving lines belong to different touch driving blocks and being driven at different display frames, adjacent driving lines may be grouped into the same touch driving block and may be driven at the same display frame.

According to one or more exemplary embodiments, the transmitting block 280 may drive the plurality of driving lines TX1, TX2, ..., TXN−1, and TXN during horizontal blank periods (e.g., periods when a horizontal synchronization signal HSYNC has a relatively low level) of the display panel 210. Further, the transmitting block 280 may drive the plurality of driving lines TX1, TX2, ..., TXN−1, and TXN such that the number of the horizontal blank periods during which each driving line TX1, TX2, ..., TXN−1, and TXN is driven increases as the number BN of the touch driving blocks increases. For example, with respect to a display apparatus where each driving line is driven during one horizontal blank period when the determined number BN is one (or when the display frame rate is equal to the touch frame rate), if the display frame rate is increased so that the determined number BN is increased to four, each driving line may be driven during four horizontal blank periods as illustrated in FIG. 6. When the display frame rate is greater than the touch frame rate, each driving line may be driven during the number of horizontal blank periods which is the same as the number BN of the touch driving blocks. In this manner, even if a time length of each horizontal blank period is decreased as the display frame rate is increased, the number of the horizontal blank periods during which each driving line is driven may be increased, and, as such, each driving line may be sufficiently charged to a target charge level.

When the display frame rate is less than or equal to the touch frame rate (S320: NO), the calculated number BN may be determined to be one (S360), and the transmitting block 280 of the touch controller 270 may drive all driving lines TX1, TX2, ..., TXN−1, and TXN at least once at each display frame (S370). According to one or more exemplary embodiments, when the display frame rate is less than or equal to the touch frame rate, all driving lines of the touch sensor 250 may be driven the number of times at each display frame, and the number of times may be determined by dividing the touch frame rate by the display frame rate and by rounding down the touch frame rate divided by the display frame rate. For example, with respect to a display apparatus with one driving line being driven during one horizontal blank period when the display frame rate is the same as the touch frame rate, if the display frame rate is less than or equal to the touch frame rate, the number of the driving lines, which may be determined by dividing the touch frame rate by the display frame rate and by rounding down the touch frame rate divided by the display frame rate, may be sequentially driven during one horizontal blank period. For example, as illustrated in FIG. 8, when the display frame rate is about 20 Hz and the touch frame rate is about 60 Hz, three driving lines TX1, TX2, and TX3 may be driven during one horizontal blank period HB. In this manner, at each display frame, all the driving lines may be driven three times. Accordingly, even if the display frame rate is decreased and a time length of one display frame is increased, the number of the driving lines that are driven during one horizontal blank period HB may be increased, and, as such, a speed of the touch sensing operation of the touch sensor 250 may not be reduced.

Figure 9:
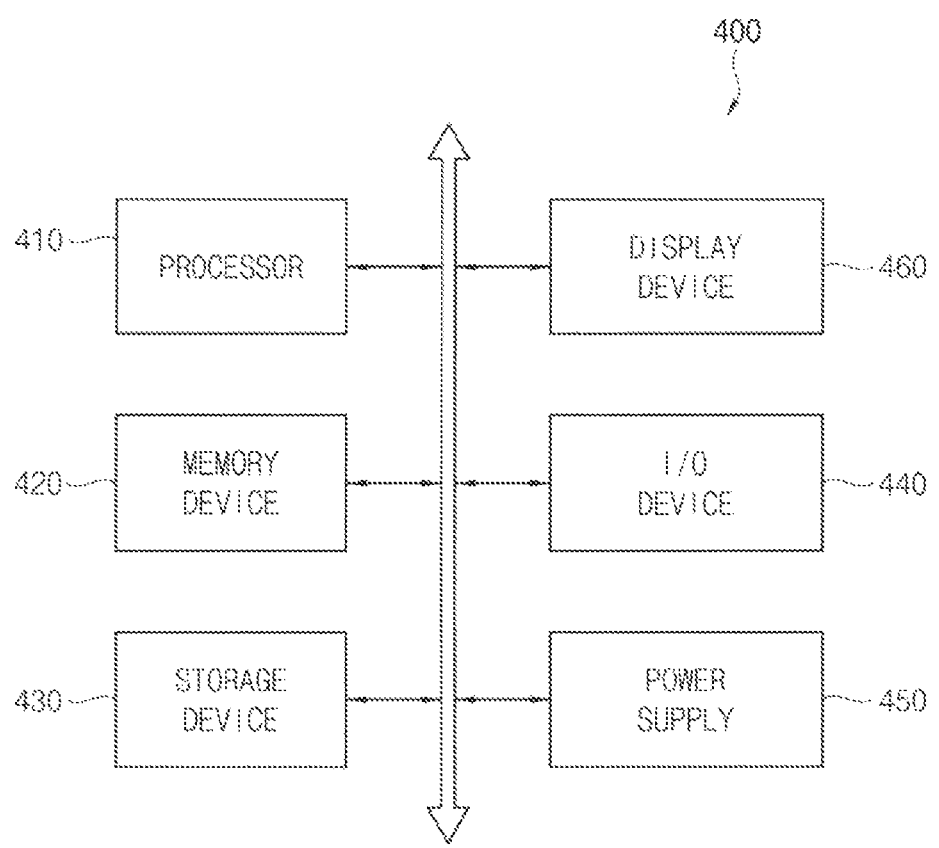
FIG. 9 is a conceptual block diagram of an electronic device including a display device, according to one or more exemplary embodiments.

FIG. 9 is a conceptual block diagram of an electronic device including a display device, according to one or more exemplary embodiments.

Referring to FIG. 9, an electronic device 400 may include a processor 410, a memory device 420, a storage device 430, an input/output (I/O) device 440, a power supply 450, and a display device 460. The electronic device 400 may further include a plurality of ports for communicating with a video card, a sound card, a memory card, a universal serial bus (USB) device, other electric devices, etc.

The processor 410 may perform various computing functions. The processor 410 may be a microprocessor, a central processing unit (CPU), an application processor (AP), etc. The processor 410 may be coupled to other components via an address bus, a control bus, a data bus, etc. Further, the processor 410 may be further coupled to an extended bus such as a peripheral component interconnection (PCI) bus.

The memory device 420 may store data for operations of the electronic device 400. For example, the memory device 420 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device, such as a dynamic random access memory (DRAM) device, a static random access memory (SRAM) device, a mobile dynamic random access memory (mobile DRAM) device, etc.

The storage device 430 may include a solid state drive device, a hard disk drive device, a CD-ROM device, etc. The I/O device 440 may include an input device such as a keyboard, a keypad, a touchpad, a mouse, a touch screen, etc, and an output device such as a printer, a speaker, etc. The power supply 450 may supply power for operations of the electronic device 400.

The display device 460 may include a display panel that displays an image, and a touch sensor including a plurality of driving lines and a plurality of sensing lines. The display device 460 may determine the number of touch driving blocks according to a display frame rate of an input image, may group the plurality of driving lines into the determined number of the touch driving blocks, and may drive one touch driving block at each display frame. Accordingly, even if the display frame rate of the input image is dynamically changed, the display device 460 may accurately and efficiently perform a touch sensing operation.

According to one or more exemplary embodiments, the electronic device 400 may include a cellular phone, a smart phone, a tablet computer, a wearable device, a personal digital assistant (PDA), a portable multimedia player (PMP), a digital camera, a music player, a portable game console, a navigation system, a digital television, a 3D television, a personal computer (PC), a home appliance, a laptop computer, etc.

According to one or more exemplary embodiments, a display apparatus and a method of sensing a touch in the display apparatus may determine the number of the touch driving blocks according to a display frame rate of an input image, may group a plurality of driving lines of a touch sensor into the determined number of the touch driving blocks, and may drive one of the touch driving blocks at each display frame. In this manner, even if the display frame rate of the input image is changed, the touch sensing operation may be accurately and efficiently performed.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of sensing a touch in a display apparatus comprising a touch sensor, the method comprising:
    determining a display frame rate of an input image applied to the display apparatus; and
    comparing the display frame rate with a touch frame rate of the touch sensor,
    wherein, in response to the display frame rate being greater than the touch frame rate, the method further comprises:
        determining a first quotient of dividing the display frame rate by the touch frame rate of the touch sensor, the first quotient being rounded up to a nearest integer in response to a remainder of the first quotient being greater than zero;
        reconfiguring the touch sensor into a total number of touch driving blocks, the total number of touch driving blocks being equivalent to-as the first quotient; and
        sensing the touch based on driving one touch driving block of the total number of the touch driving blocks at each display frame, and
    wherein, in response to the display frame rate being less than or equal to the touch frame rate, the method further comprises:
        determining a second quotient of dividing the touch frame rate by the display frame rate, the second quotient being rounded down to a nearest integer in response to a remainder of the second quotient being greater than zero; and
        sensing the touch based on driving the touch sensor through a total number of times at each display frame, the total number of times being equivalent to the second quotient.

2. The method of claim 1, wherein:
    the display apparatus comprises:
        a display panel configured to display an image; and
        the touch sensor disposed on the display panel, the touch sensor comprising driving lines and sensing lines;
    in response to the display frame rate being greater than the touch frame rate, the method further comprises:
        grouping the driving lines into the total number of the touch driving blocks; and
        driving the driving lines during horizontal blank periods of the display panel, such that a number of the horizontal blank periods during which one of the driving lines is driven increases as the total number of the touch driving blocks increases.

3. The method of claim 1, wherein:
    the display apparatus comprises:
        a display panel configured to display an image; and
        the touch sensor disposed on the display panel, the touch sensor comprising driving lines and sensing lines;
    in response to the display frame rate being greater than the touch frame rate, the method further comprises:
        grouping the driving lines into the total number of the touch driving blocks, such that a first driving line and a second driving line of the driving lines are grouped into different touch driving blocks, the first driving line being adjacent to the second driving line.

4. The method of claim 1, wherein:
the display apparatus comprises:
a display panel configured to display an image; and
the touch sensor disposed on the display panel, the touch sensor comprising driving lines and sensing lines;
in response to the display frame rate being greater than the touch frame rate, the method further comprises:
grouping the driving lines into the total number of the touch driving blocks, such that a first driving line and a second driving line of the driving lines are grouped into the same touch driving block, the first driving line being adjacent to the second driving line.

5. The method of claim 1, wherein:
the display apparatus comprises:
a display panel configured to display an image; and
the touch sensor disposed on the display panel, the touch sensor comprising driving lines and sensing lines;
in response to the display frame rate being greater than the touch frame rate, the method further comprises:
grouping the driving lines into the total number of the touch driving blocks; and
driving one of the driving lines during a number of horizontal blank periods, the number of horizontal blank periods being the same as the total number of the touch driving blocks.

6. The method of claim 1, further comprising:
driving, in response to the display frame rate being greater than the touch frame rate, the touch sensor once through a determined number of display frames, the determined number of display frames being the same as the total number of the touch driving blocks.

7. The method of claim 1, wherein:
the display apparatus comprises:
a display panel configured to display an image; and
the touch sensor display on the display panel, the touch sensor comprising driving lines and sensing lines; and
in response to the display frame rate being less than or equal to the touch frame rate, the method further comprises:
driving all of the driving lines sequentially through the total number of times during one horizontal blank period.

8. A display apparatus, comprising:
a display panel configured to display an image;
a touch sensor disposed on the display panel, the touch sensor comprising driving lines and sensing lines; and
a touch controller configured to:
determine a display frame rate of an input image applied to the display apparatus; and
compare the display frame rate with a touch frame rate of the touch sensor,
wherein, in response to the display frame rate being greater than the touch frame rate, the touch controller is further configured to:
determine a first quotient of dividing the display frame rate by the touch frame rate of the touch sensor, the first quotient being rounded up to a nearest integer in response to a remainder of the first quotient being greater than zero;
regroup all of the driving lines of the touch sensor into a total number of touch driving blocks, the total number of touch driving blocks and the first quotient being equivalent; and
drive one touch driving block of the total number of touch driving blocks at each display frame to sense a touch, and
wherein, in response to the display frame rate being less than or equal to the touch frame rate, the touch controller is further configured to:
determine a second quotient of dividing the touch frame rate by the display frame rate, the second quotient being rounded down to a nearest integer in response to a remainder of the second quotient being greater than zero; and
drive all of the driving lines of the touch sensor sequentially through a total number of times at each display frame to sense a touch, the total number of times being equivalent to the second quotient.

9. The display apparatus of claim 8, wherein the touch controller is further configured to generate touch data based on output received from the sensing lines.

10. The display apparatus of claim 8, wherein the touch controller is further configured to:
receive a display frame rate signal indicating the display frame rate from an external host configured to control the display apparatus; and
determine the display frame rate of the input image based on the display frame rate signal.

11. The display apparatus of claim 8, wherein the touch controller is further configured to:
receive a vertical synchronization signal from an external host configured to control the display apparatus; and
determine the display frame rate of the input image based on the vertical synchronization signal.

12. The display apparatus of claim 8, wherein:
the touch controller is further configured to drive the driving lines during horizontal blank periods of the display panel; and
in response to the display frame rate being greater than the touch frame rate, the touch controller is configured to drive the driving lines such that a number of the horizontal blank periods during which one of the plurality of driving lines is driven increases as the total number of the touch driving blocks increases.

13. The display apparatus of claim 8, wherein, in response to the display frame rate being greater than the touch frame rate, the touch controller is configured to:
regroup a first driving line and a second driving line of the driving lines into different touch driving blocks, the first driving line being adjacent to the second driving line; and
drive the first driving line and the second driving line in different display frames.

14. The display apparatus of claim 8, wherein, in response to the display frame rate being greater than the touch frame rate, the touch controller is configured to:
regroup a first driving line and a second driving line of the driving lines into the same touch driving block, the first driving line being adjacent to the second driving line; and
drive the first driving line and the second driving line in the same display frame.

15. The display apparatus of claim 8, wherein the touch controller is further configured to, in response to the display frame rate being greater than the touch frame rate, drive one of the driving lines during a number of horizontal blank periods, the number being the same as the total number of the touch driving blocks.

* * * * *